US009186020B1

(12) United States Patent
Phillips

(10) Patent No.: US 9,186,020 B1
(45) Date of Patent: Nov. 17, 2015

(54) OUTDOOR COOKER

(71) Applicant: Joseph Michael Phillips, Hutchinson, KS (US)

(72) Inventor: Joseph Michael Phillips, Hutchinson, KS (US)

(73) Assignee: Yoder Smokers, Inc, Hutchinson, KS (US)

(*) Notice: Subject to any disclaimer, the term of this patent is extended or adjusted under 35 U.S.C. 154(b) by 404 days.

(21) Appl. No.: 13/663,147

(22) Filed: Oct. 29, 2012

Related U.S. Application Data

(60) Provisional application No. 61/552,245, filed on Oct. 27, 2011.

(51) Int. Cl.
*A47J 37/07* (2006.01)
*F24C 15/10* (2006.01)

(52) U.S. Cl.
CPC .......... *A47J 37/0709* (2013.01); *F24C 15/101* (2013.01)

(58) Field of Classification Search
CPC ........................ F24C 15/101
USPC ........................ 126/25 R, 44, 211
See application file for complete search history.

(56) References Cited

U.S. PATENT DOCUMENTS 2,067,296 A * 1/1937 Valjean .................... 126/211
4,700,618 A * 10/1987 Cox, Jr. .................... 99/339
6,813,995 B1 * 11/2004 Sikes .................... 99/449

* cited by examiner

*Primary Examiner* — Avinash Savani

(57) ABSTRACT

An improved cooker includes a cooking chamber and a heat source. The heat source is mounted at one end of the cooking chamber. At the opposite end of the cooking chamber is a stack wall. A heat plate divides the cooking chamber into an upper cooking portion and a lower pit portion. A slidable damper plate controls the flow of hot air through the lower pit portion. The damper plate may be moved between a first position closer to the heat source than to the opposite stack wall and a second position closer to the stack wall than to the heat source.

16 Claims, 5 Drawing Sheets

OUTDOOR COOKER

RELATED APPLICATION

This application claims the benefit of U.S. Provisional Application No. 61/552,245 filed on Oct. 27, 2011 which is incorporated herein by reference.

FIELD

This invention relates to an improved outdoor cooker.

BACKGROUND

It is sometimes advantageous to have differing temperature zones within the cooking chamber of an outdoor cooker. This is particularly the case when different types of food items are being cooked or when the pit master would need a lower temperature zone for keeping cooked food items warm while other items continue to cook. Still further, it would be advantageous if the pit master could adjust size or extent of such a lower temperature zone. Accordingly, what is needed is an improved outdoor cooker with provisions for adjustable zones for providing different cooking temperatures across a cooking chamber.

SUMMARY

In order to meet the above stated needs, there is provided an improved outdoor cooker having an adjustable baffle for reducing the heat transferred to an adjustable portion of the cooking chamber. The improved outdoor cooker, in this example, includes a cooking chamber, a heat plate and an adjustable baffle. The cooking chamber is preferably generally uniform in cross section. The heat plate is generally horizontal and divides the cooking chamber into an upper cooking portion and a lower pit portion. Preferably, a removable grill for supporting food items is positioned above the heat plate. The lower pit portion extends between a firebox wall which supports a heat source and an opposite stack wall. An adjustable baffle assembly is situated in the pit portion below the cooking plate. The adjustable baffle assembly includes a generally transverse baffle plate that is operable for restricting the flow of hot combustion gases. The baffle plate is mounted in the pit portion for translation between a first position closer to the firebox wall than to the stack wall and a second position closer to the stack wall than to the firebox wall. A pit master is able to move the baffle plate between the first position and the second position or any of a plurality of positions between the first and second positions thereby establishing two cooking zones having sizes selected by the pit master. The first cooking zone is a relatively hot cooking zone that is above the portion of the lower pit portion that is between the firebox and the baffle plate. The second cooking zone is a relatively cool cooking zone that is above the portion of the lower pit portion between the baffle plate and the stack wall.

DETAILED DESCRIPTION OF THE INVENTION

Figure 1:
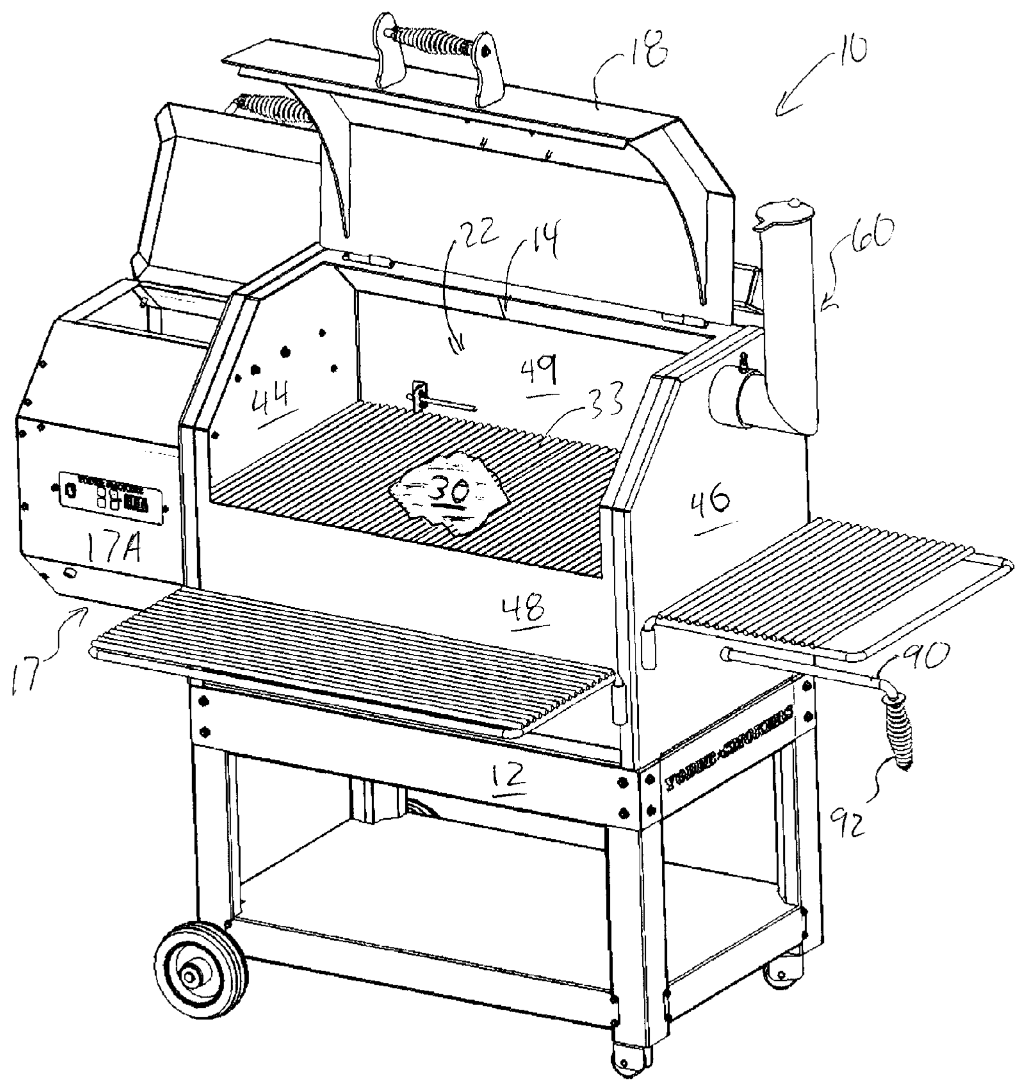
FIG. 1 is a perspective view of the improved cooker with the cooker lid open.

Referring to the drawings, FIG. 1 shows an example embodiment of an improved cooker 10. In this example, cooker 10 is typically mounted on a frame or other suitable support 12 and includes a cooking chamber 14 and a heat source 17. A lid 18 is pivotally mounted one of the walls of cooking chamber 14 and is arranged to pivot between a closed position and an open position shown in FIG. 1. In this example, heat source 17 is mounted on one end of cooker 10 and includes a pellet box 17A that supplies wood pellets via an auger or similar pellet conveying device to a firebox 17B which will be described in greater detail below.

Cooking chamber 14 is generally elongated. A generally flat, horizontal heat plate 30 divides cooking chamber 14 into an upper cooking portion 22 and a lower pit portion 40 which has a generally rectangular cross section in this example. Although lower pit portion 40 has a generally rectangular cross section in this example, lower pit portion 40 may have any cross section, as long as that cross section is uniform along at least the portion traveled by baffle plate 72. Preferably, a removable grill 33 for supporting food items is positioned above heat plate 30. Lower pit portion 40 is defined by a base plate 42, heat plate 30, a firebox wall 44, a heat plate support plate 32, a front wall 48, and a back wall 49. Base plate 42 is spaced away from heat plate 30 to define the bottom of lower pit portion 40. Firebox wall 44 extends up from base plate 42 and supports wood pellet burning firebox 17B that extends into the lower pit portion 40. In this example, a heat plate support plate 32 is spaced away from stack wall 46 and supports one end of heat plate 30. Front wall 48 extends longitudinally between the front edges of firebox wall 44 and stack wall 46. Back wall 49 extends longitudinally between back edges of firebox wall 44 and stack wall 46.

In this example, wood pellets burning inside firebox 17B supply heat to lower pit portion 40 and cooker 10. Those skilled in the art will appreciate any one of a number of heat sources may be used instead of a wood pellet burning firebox. Stack wall 46 also extends up from base plate 42 and is located opposite firebox wall 44. In this example, an exhaust stack 60 is mounted to the upper end of the stack wall 46 above heat plate 30 and grill 33 and provides an outlet that communicates with the upper cooking portion 22. Exhaust stack 60 is essentially an adjustable flue that allows combustion product gases to escape from cooking chamber 14. Hot combustion gases from firebox 17B flow mostly through lower pit portion 40 and eventually exit through exhaust stack 60. This flow of hot combustion gases through cooking chamber 14 is necessary if the combustion of wood pellets is to be sustained in firebox 17A so that the heat thereby generated is to be transferred into cooking chamber 14.

Adjustable baffle assembly 70 gives the pit master a way to select the size of a first relatively hot cooking zone that receives more heat from fire box 17B and a second relatively cool cooking zone that receives less heat from fire box 17B. Adjustable baffle 70 is situated in lower pit portion 40 below heat plate 30. In this example, adjustable baffle assembly 70 includes a generally transverse, upright baffle plate 72, a rail assembly 80 and a handle 90. Rail assembly 80 includes a pair of spaced transverse plates, a firebox end plate 82 and a stack end plate 84, as well as two spaced, generally parallel, longitudinal damper rails 86A and 86B that extend between and, in this example, are supported by firebox end plate 82 and stack end plate 84. Firebox end plate 82 is located closer to firebox 17B than to stack wall 46 while stack end plate 84 is located adjacent to stack wall 46. Firebox end plate 82 and stack end plate 84 generally extend transversely between front wall 48 and back wall 49 and vertically from base plate 42 sufficiently to support damper rails 86A and 86B, and in this example, only partially toward heat plate 30. Baffle plate 72 extends transversely between front wall 48 and back wall 49 and vertically between base plate 42 and generally toward heat plate 30. In this example, baffle plate 72 is configured so that it does not completely obstruct the transverse rectangular channel defined by lower pit portion 40. In this example, the top edge 72E of the baffle plate 72 is a concave edge that leaves a gap 72G between the center of the top edge of the baffle plate 72 and the lower surface of heat plate 30. Thus, baffle plate 72, while greatly constricting the channel defined by pit portion 40, does not completely block the channel defined by lower pit portion 40. The skilled reader may easily contemplate other configurations of baffle plate 72 other than one having a concave upper edge whereby baffle plate 72 may be configured to not completely block lower pit portion 40. For example, a baffle plate with openings, perhaps adjacent to the top edge, could provide an acceptable alternate configuration.

Figure 2:
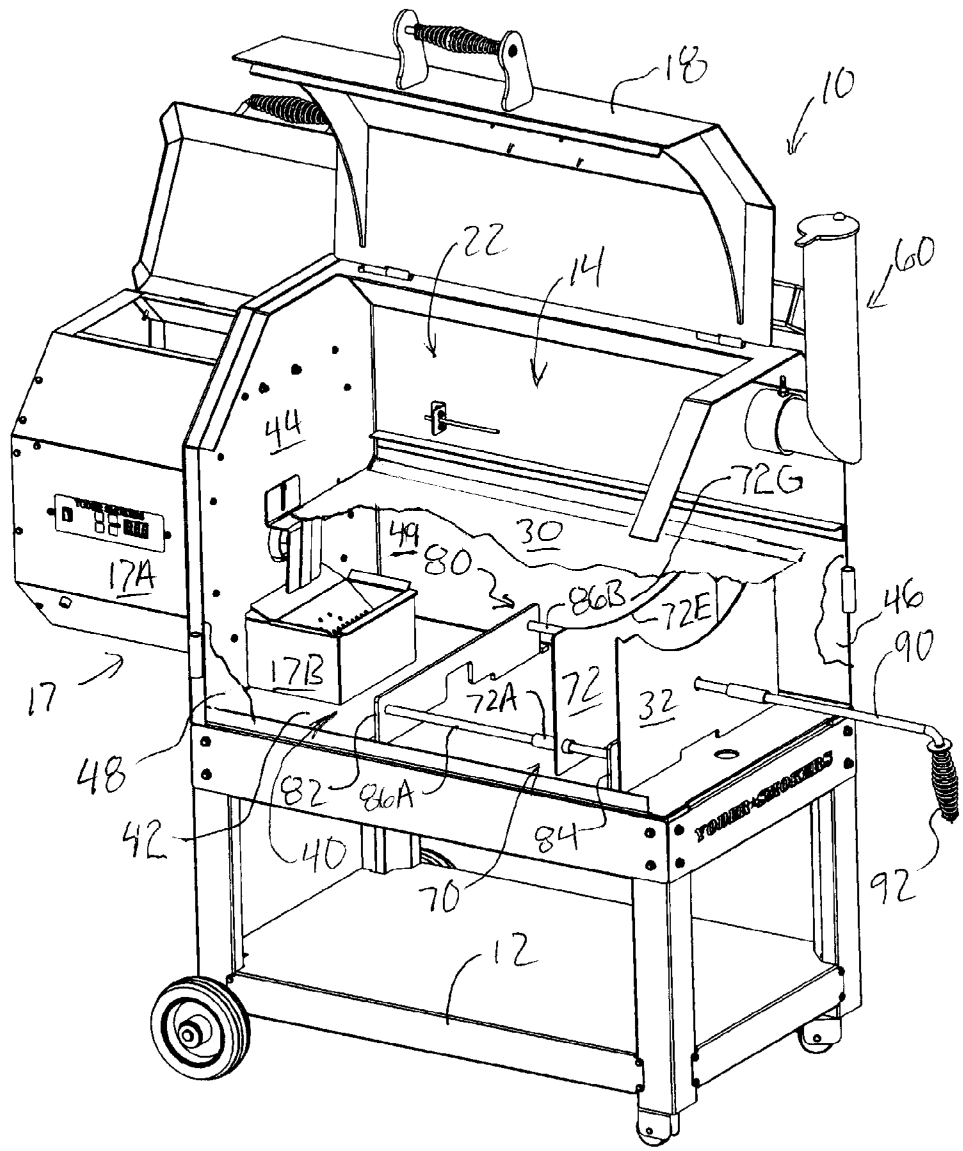
FIG. 2 is a perspective view of the improved cooker with the cooker lid open, with the heat plate, the front wall and the stack wall removed.
Figure 3:
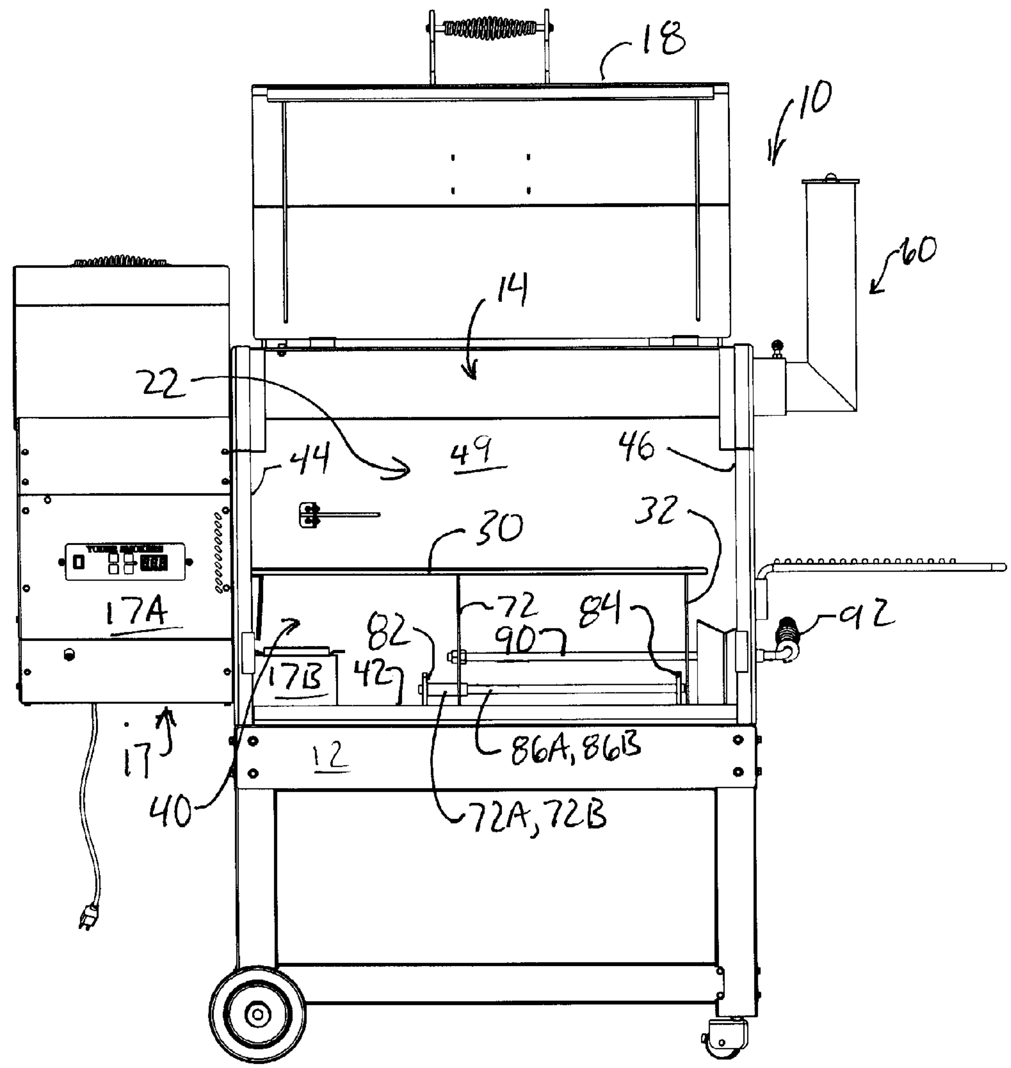
FIG. 3 is a front view of the improved cooker with the front wall removed for illustration purposes showing the adjustable damper assembly in a first position wherein the damper plate is closer to the firebox wall than to the stack wall.
Figure 4:
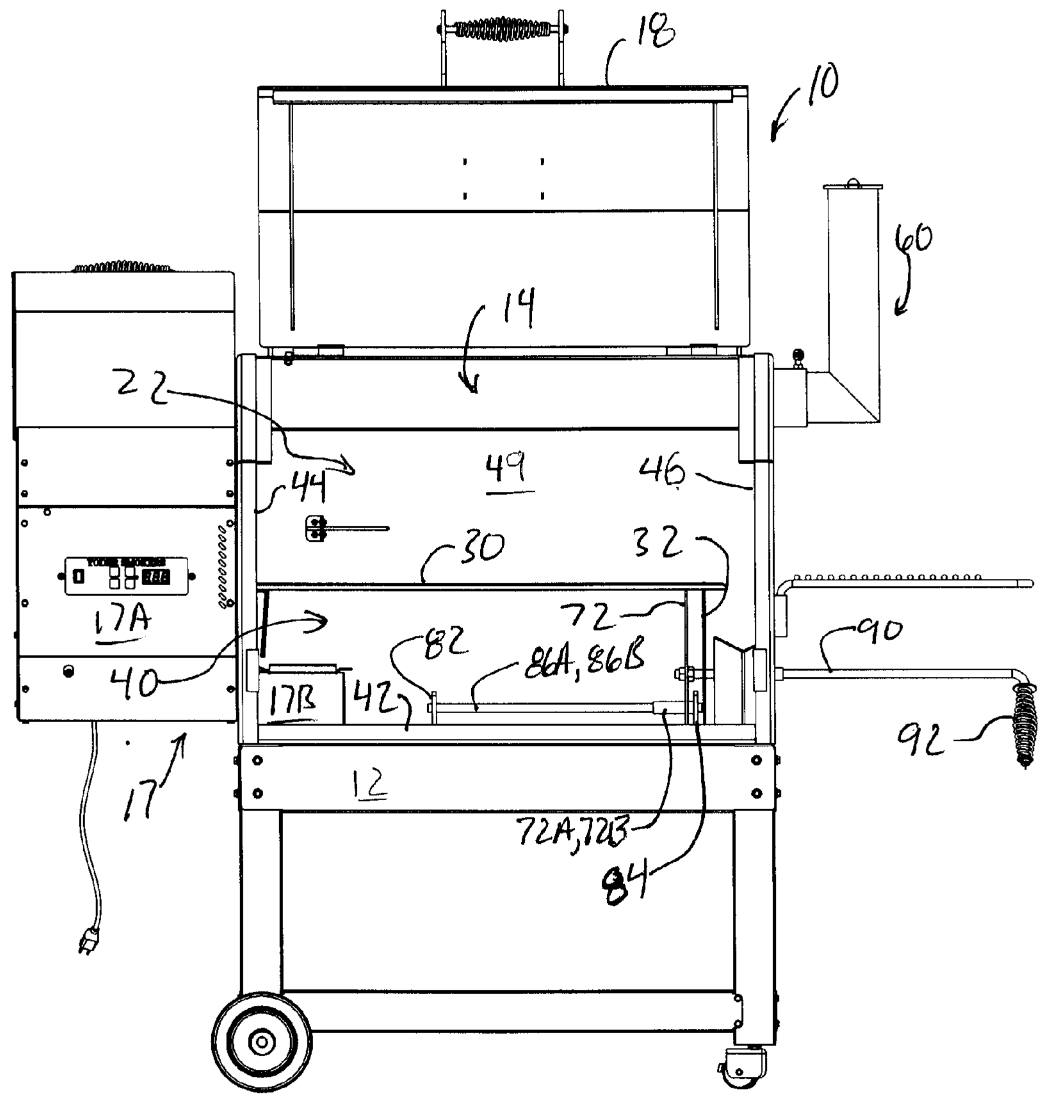
FIG. 4 is a front view of the improved cooker with the front wall removed for illustration purposes showing the adjustable damper assembly in a second position wherein the damper plate is closer to the stack wall than to the firebox wall.

In this example, as can be best seen in FIGS. 2 and 4, baffle plate 72 is slidably mounted by a pair of bushings 72A and 72B to damper rails 86A and 86B for sliding movement between a first position, shown in FIG. 3, in which baffle plate 72 is closer to firebox wall 44 than to the stack wall 46 and a second position shown in FIGS. 2 and 4, in which baffle plate 72 is closer to the stack wall 46 than the firebox wall 44. In this example, handle 90 extends from baffle plate 72 and extends through support plate 32 and stack wall 46. In this example, a handle grip 92 is mounted at the end of handle 90 opposite baffle plate 72. An operator can grasp grip 92 of handle 90 and manipulate handle 90 to move baffle plate 72 between the first position and the second position described above. In this example, the components described above for cooker 10 are preferably fashioned from steel or other suitable heat resistant materials.

Figure 5:
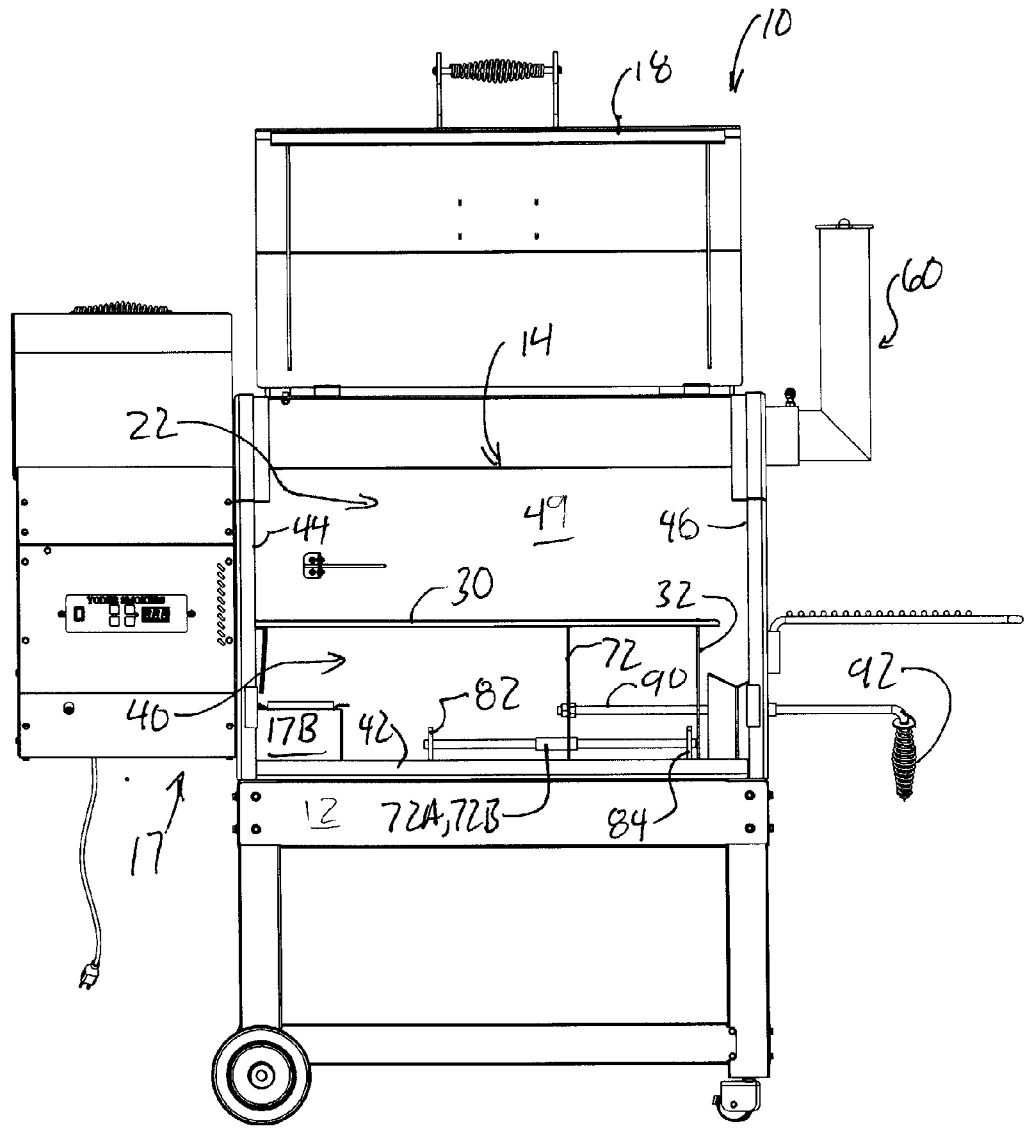
FIG. 5 is a front view of the improved cooker with the front wall removed for illustration purposes showing the adjustable damper assembly between the first position shown in FIG. 3 and the second position shown in FIG. 4.

As can be seen by comparing FIGS. 2-5, damper plate 72 may be translated between the first position shown in FIG. 3 to the second position shown in FIGS. 2 and 4, or slid to a desired intermediate position between those two positions as shown in FIG. 5. By doing so, the pit master is able to establish two cooking zones within the cooker. A first cooking zone that is generally above the portion of lower pit portion 40 that is between firebox wall 44 and damper plate 72 will operate at a relatively high temperature. Conversely, a second cooking zone that is above the portion of lower pit portion 40 that is between damper plate 72 and stack wall 49 will operate at a temperature that is lower than the temperature in the first cooking zone. Accordingly, the pit master is able to adjust cooking zone temperatures by adjusting the heat generated by firebox 17B by the usual techniques well known in the art and also by adjusting the geometry of the cooking zones as described above. Thus, it becomes possible to conduct two different types of cooking within upper pit portion 22 of cooker 10.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An improved outdoor cooker, comprising:

(a) a cooking chamber divided into an upper portion and a lower pit portion by a heat plate, (b) a heat source operable for supplying heat to the cooking chamber, the heat source mounted at one side of the lower pit portion of the cooking chamber, (c) a stack wall that is opposite the heat source, (d) a translatable transverse, damper plate mounted in the lower pit portion of the cooking chamber, the damper plate being movably adjustable between a first position wherein the damper plate is closer to the heat source than to the stack wall and a second position wherein the damper plate is closer to the stack wall than to the heat source, whereby first and second cooking zones may be established in the cooking chamber such that the first cooking zone between the heat source and the damper plate has a relatively high temperature and the second cooking zone between the damper plate and the stack wall has a relatively low cooking temperature, and whereby the relative sizes of the first and second cooking zones are adjustable with respect to each other.

2. The improved outdoor cooker of claim 1, further comprising:

a food supporting grill positioned above the heat plate.

3. The improved outdoor cooker of claim 1, wherein:

a handle extends from the damper plate for manually adjusting the position of the damper plate.

4. The improved outdoor cooker of claim 1, wherein:

the heat source is a firebox for burning wood pellets.

5. The improved outdoor cooker of claim 1, wherein:

the damper plate is slidably mounted on rails and a handle extends from the damper plate through the stack wall for manually adjusting the position of the damper plate.

6. An improved outdoor cooker, comprising:

(a) a cooking chamber divided into an upper portion and a lower pit portion by a heat plate, (b) a heat source operable for supplying heat to the cooking chamber, the heat source mounted at one side of the lower pit portion of the cooking chamber, (c) a stack wall that is opposite the heat source, (d) a translatable transverse, damper plate which is positioned under the heat plate in the lower pit portion of the cooking chamber and configured to not completely obstruct the lower pit portion of the cooking chamber, the damper plate being movable between a first position wherein the damper plate is closer to the heat source than to the stack wall and a second position wherein the damper plate is closer to the stack wall than to the heat source, whereby cooking zones may be established in the cooking chamber having a relatively high temperature between the heat source and the damper plate and relatively low temperature between the damper plate and the stack wall, and whereby the relative sizes of the first and second cooking zones are adjustable with respect to each other.

7. The improved outdoor cooker of claim 6, wherein:

a handle extends from the damper plate for manually adjusting the position of the damper plate.

8. The improved outdoor cooker of claim 6, wherein:
the damper plate is slidably mounted on rails and a handle extends from the damper plate through the stack wall for manually adjusting the position of the damper plate.

9. The improved outdoor cooker of claim 6, wherein:
the damper plate is positioned under the heat plate and has a concave upper edge in order to not completely obstruct lower pit portion under the heat plate, and,
the damper plate is slidably mounted on rails and a handle extends from the damper plate through the stack wall for manually adjusting the position of the damper plate.

10. An improved outdoor cooker, comprising:
(a) a cooking chamber including an upper portion and a lower pit portion,
(b) a heat plate positioned between the upper portion of the cooking chamber and the lower pit portion of the cooking chamber,
(c) a food-supporting grill positioned above the heat plate,
(d) a firebox operable for supplying heat to the cooking chamber, the firebox mounted in the lower pit portion of the cooking chamber to a firebox wall at one end of the cooking chamber,
(e) a stack wall that is opposite the firebox wall, the stack wall supporting an exhaust stack that communicates with the upper portion of the cooking chamber,
(f) a translatable damper plate mounted in the lower pit portion of the cooking chamber, the damper plate being movably adjustable between a first position wherein the damper plate is closer to the firebox wall than to the stack wall and a second position wherein the damper plate is closer to the stack wall than to the firebox wall, the damper plate being generally transversely oriented in relation to its direction of movement, whereby cooking zones may be established in the cooking chamber wherein a first cooking zone in the cooking chamber above the lower pit portion between firebox wall and the damper plate is at a first temperature, and a second cooking zone above lower pit portion between the damper plate and the stack wall is at a second temperature which is lower than the first temperature and whereby the relative sizes of the first and second cooking zones are adjustable with respect to each other.

11. The improved outdoor cooker of claim 10, wherein:
a handle extends from the damper plate for manually adjusting the position of the damper plate.

12. The improved outdoor cooker of claim 10, wherein:
the damper plate is slidably mounted on rails and a handle extends from the damper plate through the stack wall for manually adjusting the position of the damper plate.

13. An improved outdoor cooker, comprising:
(a) a cooking chamber including an upper portion and a lower pit portion,
(b) a heat plate positioned between the upper portion of the cooking chamber and the lower pit portion of the cooking chamber,
(c) a food supporting grill positioned above the heat plate,
(d) a fire box operable for supplying heat to the cooking chamber, the fire box mounted in the lower pit portion of the cooking chamber to a fire box wall at one end of the cooking chamber,
(e) a stack wall that is opposite the firebox wall, the stack wall supporting an exhaust stack that communicates with the upper portion of the cooking chamber,
(f) a translatable damper plate mounted in the lower pit portion of the cooking chamber and configured to not completely obstruct the lower pit portion of the cooking chamber, the damper plate being movably adjustable between a first position wherein the damper plate is closer to the firebox wall than to the stack wall and a second position wherein the damper plate is closer to the stack wall than to the firebox wall, the damper plate being generally transversely oriented in relation to its direction of movement, whereby cooking zones may be established in the cooking chamber wherein a first cooking zone in the cooking chamber above the lower pit portion between firebox wall and the damper plate is at a first temperature, and a second cooking zone above lower pit portion between the damper plate and the stack wall is at a second temperature which is lower than the first temperature and whereby the relative sizes of the first and second cooking zones are adjustable with respect to each other.

14. The improved outdoor cooker of claim 13, wherein:
a handle extends from the damper plate for manually adjusting the position of the damper plate.

15. The improved outdoor cooker of claim 13, wherein:
the damper plate is slidably mounted on rails and a handle extends from the damper plate through the stack wall for manually adjusting the position of the damper plate.

16. The improved outdoor cooker of claim 13, wherein:
the damper plate is positioned under the heat plate and has a concave upper edge in order to not completely obstruct lower pit portion under the heat plate, and,
the damper plate is slidably mounted on rails and a handle extends from the damper plate through the stack wall for manually adjusting the position of the damper plate.

* * * * *